Patented Oct. 4, 1938

2,131,864

UNITED STATES PATENT OFFICE 2,131,864

PROCESS OF MAKING HEPTAMETHINE DYES

Walter Zeh, Dessau in Anhalt, Germany, assignor to Agfa Ansco Corporation, Binghamton, N. Y., a corporation of New York No Drawing. Application May 11, 1934, Serial No. 725,214. In Germany May 18, 1933

5 Claims. (Cl. 260—240)

My present invention relates to dyes of the polymethine series.

One of its objects is to provide a process of producing dyes from the polymethine series. Another object are the dyes of the polymethine series which have proved to be valuable sensitizers. Further objects will be seen from the detailed specification following hereafter.

The symmetrical heptamethinecyanines have already been proposed as sensitizers for the range of wave lengths between $650\mu\mu$ and $1000\mu\mu$.

According to this invention I have found, that the unsymmetrical heptamethinecyanines are well suited for sensitizing a silver halide emulsion for this range of wave lengths. The progress involved by the new sensitizers resides not only in the fact that an extraordinary great number of suitable dyes is now available, but also in the fact, that by suitably combining different quaternary ammonium salts of heterocyclic bases containing in $\alpha$-position to the nitrogen atom a methyl group capable of reaction nearly any desired maximum of sensitization may be obtained in the infra-red portion of the spectrum. Thus it is possible to adjust the sensitivity of the emulsion according to requirement.

For the preparation of the unsymmetrical heptacarbocyanines there is first made an intermediate product by condensing in the presence of an alkaline condensing agent equivalent portions of a quaternary ammonium salt of a heterocyclic base containing in $\alpha$-position to the nitrogen atom a methyl group capable of reaction and of a $\epsilon$-phenylimido-$\alpha$-$\gamma$-pentadiene hydrohalogenide. As alkaline condensing agent I have found suitable, for instance, primary, secondary and tertiary amines, such as methylamine, diethylamine, trimethylamine, triethylamine, piperidine, pyridine, or sodium ethylate, or ethanolamines. The amount of condensing agent used is preferably a quantity at most equivalent to that of the base which is used, because an increasing amount of condensing agent promotes the formation of symmetrical dye from which the intermediate product must be separated, usually by physical means (crystallization, decocting). The most suitable amount to be used of each condensing agent can easily be determined by experiment. Condensing agents which may casually be applied in excess so that nevertheless the formation of intermediate product occurs are the amines. In case of using pyridine or condensing agents of similar action which simultaneously are used as solvents, there may be used an excess for obvious reasons. Of the above anilido compounds the N-methyl compounds have proved particularly suitable in some cases. It is advisable to use an amount of the anilido compound substantially exceeding the quantity equivalent to that of the base; preferably there is used a more than 10 per cent excess in order to avoid as far as possible the undesired formation of symmetrical dye.

When using, for example, benzothiazole as the heterocyclic base, the reaction between 2-methylbenzothiazole iodo alkylate and $\epsilon$-phenylimido-$\alpha$-phenylamido-$\alpha.\gamma$-pentadienehydrobromide probably takes place according to the following formula:

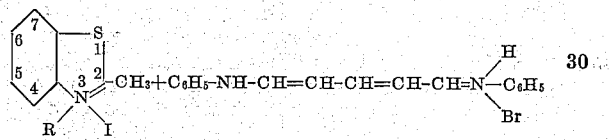

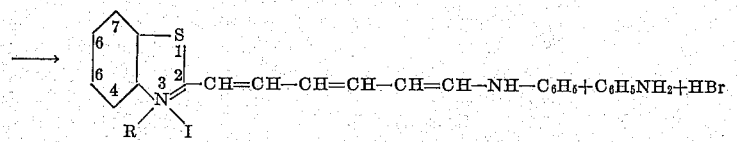

In this manner the intermediate hexamethine dyestuff corresponding with the above formula is formed, which is then converted with the quaternary ammonium salt of another heterocyclic base containing a reactive methyl group, as for example quinaldine iodo alkylate, in the presence of an alkaline condensing agent, according to the following formula:

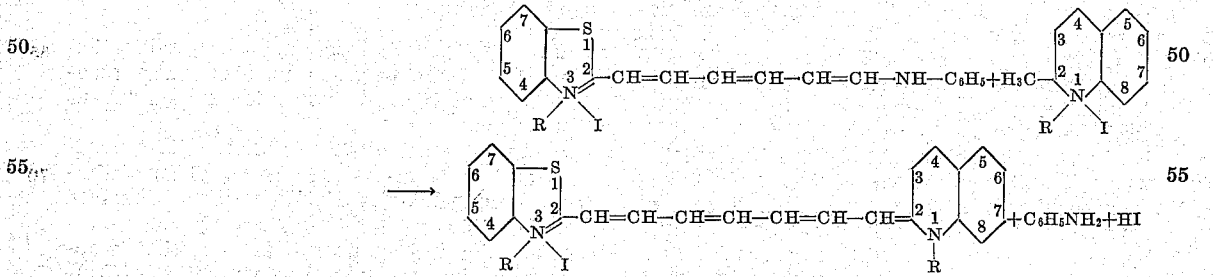

This process may be carried out with all heterocyclic bases containing a reactive methyl group, in particular with mono- and polynuclear thiazoles, selenazoles, 2- and 4-methylquinolines. For example pyridine, piperidine ethanolamines, alkylamines and sodium ethylate are suitable alkaline condensing agents.

The heptamethinecyanine dyestuffs obtained according to the present invention have the following general formula, from which the comprehensive application of this new process may be recognized:

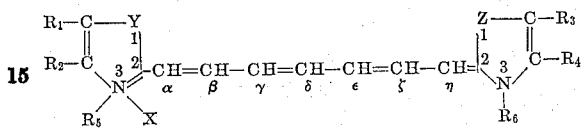

wherein

Y and Z are S, Se, —CH=CH—

$R_1$, $R_2$, $R_3$, $R_4$ represent hydrogen, alkyl or aryl, or, if desired, $R_1R_2$ and $R_3R_4$ in combination represent unsubstituted or substituted phenylene, naphthylene or other polynuclear arylene groups. (Alkyl, aryl, alkoxy, thioalkyl, selenoalkyl, substituted or unsubstituted amino groups belong to the substituents contemplated.)

For the unsymmetrical character of the dye it is necessary, that Y and Z or $R_1$, $R_2$ and $R_3$, $R_4$ are different from each other.

$R_5$ and $R_6$ represent alkyl,

X represents an anion for instance, Cl, Br, I, $ClO_4$, $CH_3$—$C_6H_4$—$SO_3$, $CH_3$—$SO_4$, $C_2H_5$—$SO_4$.

The quinoline nucleus which results in case of Y being —CH=CH— may be linked to the polymethenyl chain in 2 or 4 position. The hydrogen atoms of the heptamethine chain may be substituted by alkyl groups, as for example methyl or ethyl.

In the general formula Y and Z may represent sulfur, selenium or the vinyl group CH=CH. In the case of dyes in which, for instance, a thiazole nucleus and a selenazole nucleus are linked together by a heptamethenyl chain $R_1$, $R_2$, $R_3$ and $R_4$ may represent hydrogen, or they may represent alkyl, or aryl or carbethoxy. In combination $R_1R_2$ and $R_3R_4$ may represent phenylene, or naphthylene or a polynuclear arylene group, for instance, the corresponding radical of anthracene, chrysene, fluorene or acetnaphthene. In the case of Y being sulfur, Z being selenium, $R_1R_2$ and $R_3R_4$ being phenylene, the dye is a [benzthiazole-(2)]-[benzselenazole-(2)]-hepta - methinecyanine. If Y is selenium, Z is sulfur, $R_1R_2$ is phenylene, and $R_3$ and $R_4$ are hydrogen the dye is a [benzselenazole-(2)]-[thiazole-(2)]-heptamethinecyanine. This not only illustrates the dyes which are contemplated by the invention but also the nomenclature. In the case of Y being CH=CH, Z being sulfur and $R_1,R_2,R_3,R_4$ being hydrogen, there result dyes in which a pyridine nucleus is linked together with a thiazole nucleus by a heptamethenyl chain. If Y is CH=CH, Z is sulfur, $R_1R_2$ is phenylene, $R_3$ and $R_4$ are hydrogen, there results a dye in which a quinoline nucleus is linked together with a thiazole nucleus by a heptamethenyl chain and is called a [quinoline]-[thiazole-(2)]-heptamethinecyanine. The quinoline nucleus may be linked in 2 or 4 position. The benzene rings and so on fused on the heterocyclic rings containing a nitrogen atom may be substituted for instance by alkyl, alkoxy, aryl, halogen, substituted or unsubstituted amino groups. The radicals $R_5$ and $R_6$ linked to the nitrogen atoms of the heterocyclic rings linked together by the heptamethenyl chain represent alkyl. X represents an anion, for instance those disclosed above.

The dyes are obtainable according to the desired solubility in form of the bromide, iodide, perchlorate etc. and are used in a quantity such as is usual for the known sensitizing dyes. This quantity may amount to about 0.5 to 2 milligrams per 1 kg. of emulsion ready for being cast which contains about 9 per cent of gelatin, 4.5 per cent of silver halide and the rest water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before casting.

The dyes may likewise be added to the emulsion by bathing the finished photographic material in a bath in which the dye is dissolved. Such a treatment may be as follows: The photographic material to be sensitized is bathed in a solution containing 1 milligram of [3-ethyl-benzselenazole-(2)] - [1 - ethyl-quinoline - (4)] - heptamethinecyanine iodide in 500 to 1000 cc. of an aqueous solution of methanol of 50 per cent strength for about 5 minutes. The material is then dried, whereupon it is ready for use.

The following examples serve to illustrate the invention.

*Example 1.*—In order to obtain [3-ethyl-benzthiazole-(2)]-[3 - ethyl-{naphtho - 1'.2' : 4.5-thiazole}-(2)]-heptamethinecyanine iodide having the formula:

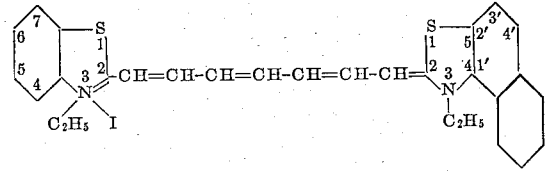

15 grams of 2-methylbenzthiazole ethiodide are boiled with 20 grams of ε-phenylimido-α-phenylamido-α, γ-pentadienehydrobromide in 50 cc. of alcohol and then mixed with 1.5 cc. of piperidine; the mixture is boiled for further 30 minutes and then cooled. By adding 50 cc. of a solution of potassium iodide of about 2 per cent strength, the dyestuff (intermediate product) corresponding probably with the formula:

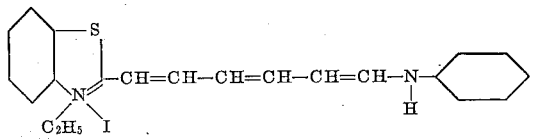

separates in green floccules. Recrystallization from alcohol yields green needles. The alcoholic solution has an absorption maximum at about 625μμ.

1.8 grams of this dyestuff (intermediate product) and 1.2 grams of 2-methyl-[naphtho-1'.2':4.5-thiazole]-diethylsulfate are dissolved in 10 cc. of diethylamine. This mixture is maintained boiling until a dark blue coloration is obtained. On cooling, [3-ethyl-benzthiazole-(2)]-[3-ethyl-{naphtho-1'.2':4.5-thiazole}-(2)]-hep - tamethinecyanine iodide separates on addition of about 5 cc. of a 5 per cent solution of potassium iodide; brownish green little rods crystallize from alcohol.

Incorporated in a silver bromide emulsion containing about 4 per cent of silver iodide the dye imparts to it a range of sensitivity from about 650μμ to 930μμ with a maximum of about 830μμ.

Example 2.—[3-ethyl-benzthiazole-(2)]-[3-ethyl-5.6-dimethyl-benzselenazole-(2)]-heptamethinecyanine iodide having the formula:

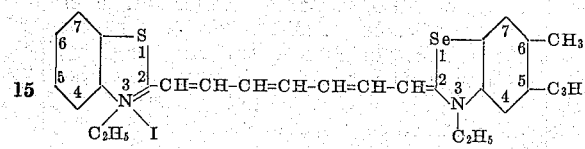

is obtained according to Example 1 from the intermediate product specified therein and the equivalent amount of 2,5,6-trimethylbenzselenazole ethiodide. The dyestuff crystallizes in green crystals during the reaction.

Incorporated in a silver bromide emulsion containing about 4 per cent of silver iodide the dye imparts to it a range of sensitivity from about 650μμ to 900μμ with a maximum of about 825μμ.

Example 3.—[3-ethyl-benzthiazole-(2)]-[1-ethyl-quinoline-(4)]-heptamethinecyanine perchlorate having the formula:

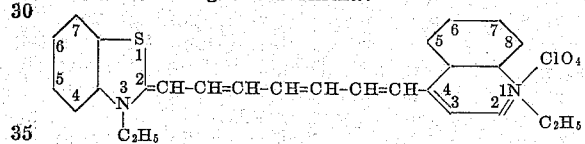

is obtained by heating 1.8 grams of phenylamido-1-ethyl benzthiohexamethine iodide (intermediate product), obtained according to Example 1, in 10 cc. of alcohol together with 1 gram of lepidine ethiodide until the whole is dissolved and, after adding 1 cc. of diethylamine, boiled until the reaction mixture assumes a dark green color. By the addition of 5 cc. of a 10 per cent aqueous solution of sodium perchlorate, the dye separates. It crystallizes from alcohol in small brownish red plates.

Incorporated in a silver bromide emulsion containing about 2 per cent of silver iodide the dye imparts to it a range of sensitivity from about 650μμ to 920μμ with a maximum of about 825μμ.

Example 4.—In order to produce the dyestuff corresponding with the forumla:

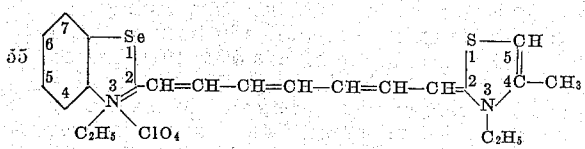

17.5 grams of 2-methylbenzselenazole ethiodide

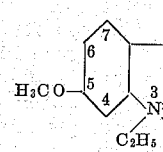

and 20 grams of ε-phenylimido-α-phenylamido-α,γ-pentadiene hydrobromide are dissolved in 50 cc. of alcohol in the warmth, mixed with 1.5 cc. of piperidine and boiled for half an hour. After cooling, the resulting phenylamido-1-ethylbenzselenohexamethine iodide is precipitated by the addition of 50 cc. of a 5 per cent aqueous solution of potassium iodide. Recrystallization from alcohol yields dark green crystals which in alcoholic solution have an absorption maximum at about 638μμ.

4 grams of this intermediate product, 2.5 grams of 2,4-dimethylthiazole ethiodide and 2 cc. of diethylamine are boiled in 10 cc. of alcohol until the mixture assumes an intense blue color. After cooling, the dyestuff is precipitated by adding 3 cc. of a 10 per cent solution of sodium perchlorate. Druses of green crystals are obtained by recrystallizing from alcohol.

Incorporated in a silver bromide emulsion containing about 2 per cent of silver iodide the dye imparts to it a range of sensitivity from about 600μμ to 880μμ with a maximum at about 785μμ.

Example 5.—In order to obtain [3-ethyl-benzselenazole-(2)]-[1-ethyl-quinoline-(4)]-heptamethinecyanine iodide corresponding with the following formula:

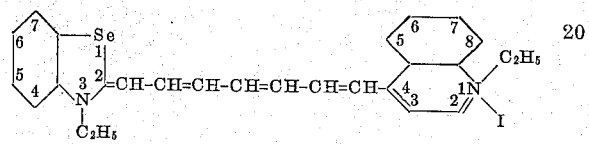

4,5 grams of 2-methylbenzselenazole ethiodide and 5 grams of ε-N-methylphenylimido-α-N-methylphenylamido-α γ-pentadienehydrobromide are boiled for 30 minutes in 25 cc. of alcohol, while adding 1 cc. of triethanolamine. On cooling, the hexamethine dye corresponding probably with the formula:

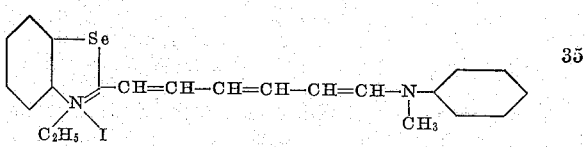

separates in green needles. The alcoholic solution of the dyestuff has an absorption maximum at about 610μμ.

2 grams of the dyestuff (intermediate product) thus obtained and 1.5 grams of lepidine iodo ethylate are dissolved in 20 cc. of alcohol in the warmth and boiled after the addition of 1 cc. of triethylamine until the separation of [3-ethyl-benzselenazole-(2)]-[1-ethyl-quinoline-(4)]-heptamethinecyanine iodide commences. The dyestuff crystallizes from alcohol in brown crystals.

Incorporated in a silver bromide emulsion containing about 2 per cent of silver iodide the dye imparts to it a range of sensitivity from about 660μμ to 930μμ with a maximum at about 825μμ.

Example 6.—In order to produce [3-ethyl-5-methoxy-benzselenazole-(2)]-[3-ethyl-5-diethylamino-benzthiazole-(2)]-heptamethinecyanine iodide having the following formula:

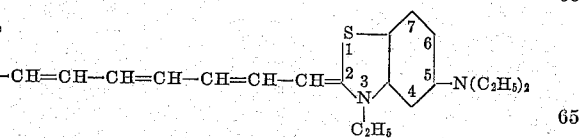

the intermediate dyestuff corresponding probably with the following formula:

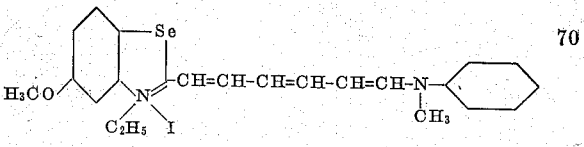

is produced from 2-methyl-5-methoxybenzselenazole ethiodide according to Example 5 and has an absorption maximum of about 615μμ.

2 grams of this dyestuff are dissolved with 1.5 grams of 2-methyl-5-diethylaminobenzthiazole ethiodide in 10 cc. of hot alcohol and gradually mixed with 4 cc. of an alcoholic solution of sodium ethylate (containing 3 per cent of sodium) and kept boiling, until the mixture assumes a bluish green color. The dye which is precipitated on cooling crystallizes from alcohol in copper-brown crystals.

Incorporated in a silver bromide emulsion containing about 4 per cent of silver iodide the dye imparts to it a range of sensitivity from about 700μμ to 900μμ with a maximum at about 855μμ.

*Example 7.*—In order to obtain [3-ethyl-benzthiazole-(2)]-[3-e t h y l-{naphtho-2'.1':4.5-thiazole}-(2)]-δ-methyl-heptamethinecyanine iodide corresponding with the formula:

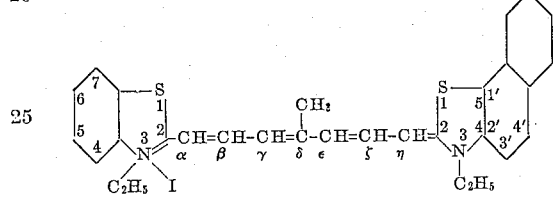

4 grams of 2-methylbenzthiazole ethiodide are boiled with 5 grams of ε-phenylimido-α-phenyl-a m i d o-γ-methyl-α,γ-pentadiene hydrobromide (obtained from aniline, γ-picoline and cyanogen bromide analogously to the unsubstituted compound, according to the process described by König, in Journ. f. prakt. Chemie, 69, p. 105) in 20 cc. of alcohol, mixed with 0.8 cc. of piperidine and heated for 30 minutes on the steam bath. After cooling the dark blue mixture, 20 cc. of a 5 per cent aqueous solution of potassium iodide are added, and the hexamethine dye (intermediate product) formed and corresponding with the following formula:

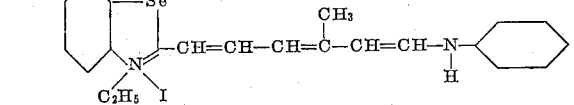

is filtered off. The dyestuff crystallizes from alcohol in blue needles. The alcoholic solution has an absorption maximum at about 620μμ.

1 gram of the intermediate product and 0.8 gram of 2-methyl-[naphtho-2'.1':4.5-thiazole] ethiodide are dissolved in 10 cc. of boiling alcohol and kept boiling for 10 minutes, while adding 0.7 cc. of diethylamine. The resulting [3-ethyl-benzthiazole-(2)]-[3'-ethyl-(naphtho-2'.1': 4.5-thiazole)-(2)]-δ-methyl-heptamethinecyanine iodide is recrystallized from alcohol thereby yielding druses of dark brown crystals.

Incorporated in a silver bromide emulsion containing about 4 per cent of silver iodide the dye imparts to it a range of sensitivity from about 630μμ to 920μμ with a maximum at about 840μμ.

*Example 8.*—In order to produce [3-ethyl-6-m e t h y l-quinoline-(2)]-[3-ethyl-benzthiazole-(2)]-heptamethinecyanine iodide having the following formula:

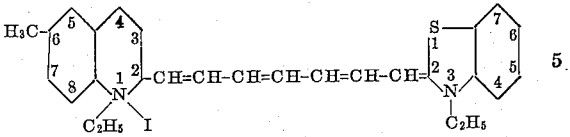

a mixture of 4 grams of toluquinaldine iodo ethylate and 5 grams of ε-N-methylphenylimido-α-N-methylphenylamido-α-γ-pentadiene hydrobromide are boiled in 25 cc. of alcohol and, after the addition of 1 cc. of diethylamine kept for about 5 hours on the steam bath. After cooling, the reaction product which separates is recrystallized from alcohol. The dye (intermediate product) obtained corresponds probably with the formula:

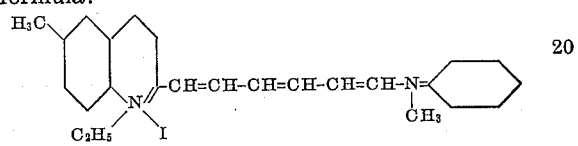

and forms green crystals, the alcoholic solution of which has an absorption maximum at about 605μμ.

2 grams of the dye (intermediate product) thus obtained are dissolved with 1.5 grams of 2-methylbenzthiazole ethiodide in 10 cc. of boiling alcohol and gradually mixed, while boiling, with about 3 cc. of a 3 per cent solution of sodium ethylate. Boiling is continued until the mixture assumes a greenish blue color. The dye crystallizes from alcohol in green needles.

Incorporated in a silver bromide emulsion containing about 2 per cent of silver iodide the dye imparts to it a range of sensitivity from about 630μμ to 930μμ with a maximum at about 828μμ.

*Example 9.*—In order to produce the dyestuff having the formula:

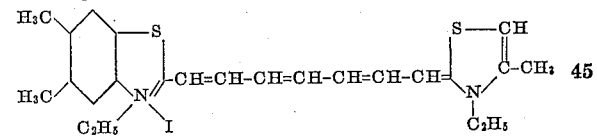

0.5 cc. of triethanolamine is added to a boiling solution of 4 grams of 2,5,6-trimethylbenzthiazole ethiodide and 5 grams of ε-N-methylphenylimido - α - N-methylphenylamido-α,γ-pentadienehydrobromide in 25 cc. of alcohol, and boiling continued for one hour. On cooling, the intermediate dyestuff separates in form of bluish green needles. 1 gram of this dyestuff is heated for 10 minutes with 1 gram of 2.4-dimethylthiazole ethiodide in 10 cc. of alcohol, while adding 1 cc. of diethylamine, until the mixture assumes a bluish green color. On cooling, the dyestuff crystallizes in brownish green crystals.

Incorporated in a silver bromide emulsion containing about 2 per cent of silver iodide the dye imparts to it a range of sensitivity from about 600μμ to 910μμ with a maximum at about 800μμ.

*Example 10.*—In order to produce [3-ethyl-5-diethylamino-benzthiazole-(2)]-[3-ethyl-q u i n-o l i n e-(4)]-heptamethinecyanine perchlorate corresponding with the following formula:

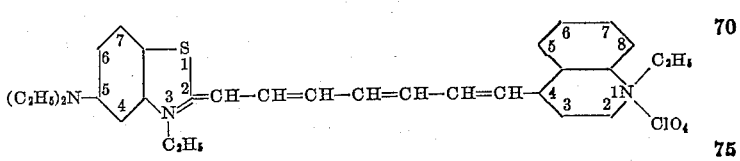

4 grams of 2-methyl-5-diethylamidobenzthiazole ethiodide are boiled with 5 grams of ε-(N-methyl-phenylimido)-α-(N-methylphenylamido)-α,γ-pentadiene hydro-bromide in 20 cc. of alcohol, while adding about 1 cc. of triethanolamine, until the mixture assumes a dark blue color. The resulting hexamethine dyestuff (intermediate product) corresponding probably with the formula:

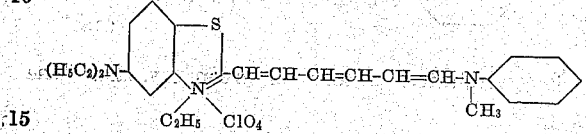

is precipitated in green floccules, while adding 10 cc. of an aqueous solution of sodium perchlorate of 10 per cent strength. The alcoholic solution of the product has an absorption maximum at about 635μμ.

In order to obtain [3-ethyl-5-diethylamino-benzthiazole-(2)]-[3-ethyl-q u i n o l i n e-(4)]-heptamethinecyanine perchlorate, 1.5 grams of the intermediate product are heated with 2.5 grams of lepidine ethiodide in 10 cc. of alcohol, while gradually adding about 1 cc. of diethylamine, until the mixture assumes a greenish blue color. The dyestuff separates in dark floccules on the addition of 10 cc. of a solution of sodium perchlorate. A bluish-black crystalline powder is obtained by recrystallization from alcohol.

Incorporated in a silver bromide emulsion containing about 2 per cent of silver iodide the dye imparts to it a range of sensitivity from about 650μμ to 1000μμ with a maximum at about 865μμ.

Example 11.—The intermediate product obtained according to Example 10 may be converted according to the manner specified therein by means of 2.4-dimethylthiazole-methiodide into [3-e t h y l-5-diethylamino-benzthiazole-(2)]-[3-ethyl-4-m e t h y l-thiazole-(2)]-heptamethinecyanine perchlorate corresponding probably with the formula:

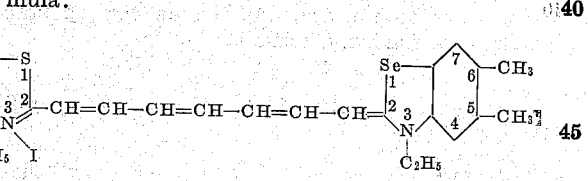

Recrystallization from alcohol yields bronze colored crystals.

Incorporated in a silver bromide emulsion containing about 2 per cent of silver iodide the dye imparts to it a range of sensitivity from about 600μμ to 920μμ with a maximum at about 820μμ.

Example 12.—In order to obtain [3-ethyl-5-methoxy-benzselenazole-(2)]-[3-ethyl-4-phenyl-thiazole-(2)]-heptamethinecyanine iodide corresponding probably with the following formula:

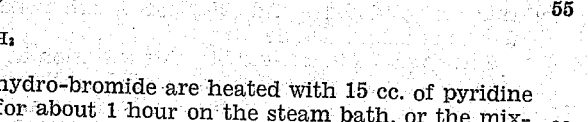

1 gram of N-ethyl-6-methoxybenzselenohexamethine-N-methylanilido iodide, as obtained according to Example 6, and 1 gram of 2-methyl-4-phenylthiazole methiodide are boiled for about 5 minutes in 10 cc. of alcohol, while adding 1 cc. of an alcoholic solution of trimethylamine of 50 per cent strength. The dye separates in form of green crystals.

Incorporated in a silver bromide emulsion containing about 2 per cent of silver iodide the dye imparts to it a range of sensitivity from about 600μμ to 900μμ with a maximum at about 800μμ.

Example 13.—In order to produce [3-ethyl-benzselenazole-(2)]-[3-ethyl-pyridine-(2)]-heptamethinecyanine perchlorate corresponding probably with the formula:

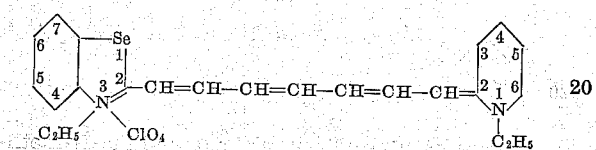

1 gram of N-ethylbenzselenohexamethine-N-methylanilido iodide (made according to Example 5) and 1 gram of α-picoline ethiodide are carefully boiled in 5 cc. of pyridine, until the mixture assumes a dark blue color. When adding 5 cc. of an aqueous solution of sodium perchlorate of 10 per cent strength, the dye is precipitated in blue floccules.

Incorporated in a silver bromide emulsion containing about 2 per cent of silver iodide the dye imparts to it a range of sensitivity from about 550μμ to 810μμ with a maximum at about 740μμ.

Example 14.—In order to obtain [3-ethyl-5-ethoxy-6-methyl-benzthiazole-(2)]-[3-ethyl-5.6-dimethyl-benzselenazole-(2)]-heptamethinecyanine iodide probably having the following formula:

4 grams of 2.6-dimethyl-5-ethoxybenzthiazole ethiodide and 5 grams of ε-N-methyl-phenylimido-α-N-methyl-phenylamido-α,γ-pentadiene hydro-bromide are heated with 15 cc. of pyridine for about 1 hour on the steam bath, or the mixture is boiled for a short time, say 3 to 5 minutes. The separation of the intermediate product may be completed by the addition of about 10 cc. of a solution of potassium iodide. The intermediate dyestuff having the following formula:

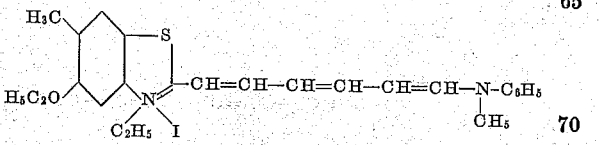

crystallizes from alcohol in form of a blackish green crystal powder. The alcoholic solution of the compound has an absorption maximum at about 610μμ. 1 gram of the resulting intermemediate product in admixture with the same amount of 2.5.6-trimethylbenzselenazole ethiodide is boiled in 10 cc. of alcohol while adding 0.5 cc. of triethanolamine, until the dyestuff is precipitated in green crystals.

Incorporated in a silver bromide emulsion containing about 4 per cent of silver iodide, the dye imparts to it a range of sensitivity from about 750μμ to 900μμ with a maximum at about 840μμ.

*Example 15.*—In order to obtain [3-ethyl-benzthiazole-(2)]-[3-ethyl-5-carbethoxy-thiazole-(2)]-heptamethinecyanine iodide corresponding probably with the following formula:

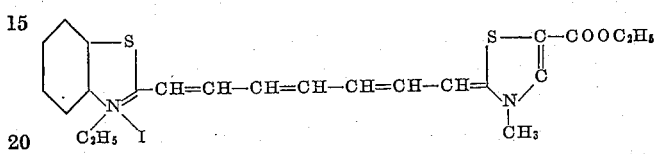

1 gram of N-ethylbenzthiohexamethine-N-methylanilido iodide as obtainable from 2-methylbenzthiazole iodo ethylate and ε-N-methylphenylimido-α-N-methylphenylamido bromide in alcoholic solution analogously to the method described in Example 10 and 0.7 gram of 2.4-dimethyl-5-carbethoxythiazole methiodide are dissolved in 10 cc. of alcohol in the warmth and boiled for about 5 minutes after the addition of about 1 cc. of diethylamine. On cooling the dyestuff separates in form of a bluish black crystalline powder.

Incorporated in a silver bromide emulsion containing about 2 per cent of silver iodide, the dye imparts to it a range of sensitivity from about 650μμ to 900μμ with a maximum at about 800μμ.

*Example 16.*—[3-ethyl-benzthiazole-(2)]-[3-ethyl-{tetrahydronaphtho-2′.1′:4.5-thiazole}-(2)]-heptamethinecyanine iodide corresponding with the following formula:

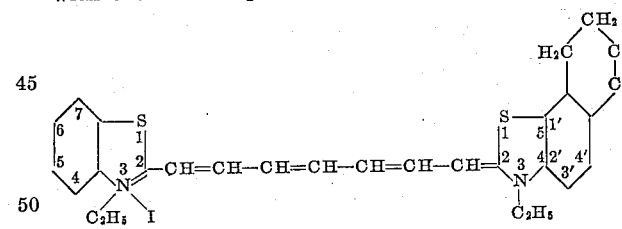

is obtained in the manner described in Example 15, from 2-methyl-tetrahydronaphtho-2′.1′:4.5-thiazole ethiodide and N-ethyl-benzthiohexamethine anilido iodide.

Incorporated in a silver bromide emulsion containing about 4 per cent of silver iodide, the dye imparts to it a range of sensitivity from about 670μμ to 880μμ with a maximum at about 615μμ.

*Example 17.*—In order to obtain [1-methyl-quinoline-(4)]-[3-ethyl-6-methoxy-benzthiazole-(2)]-heptamethinecyanine iodide corresponding probably with the following formula:

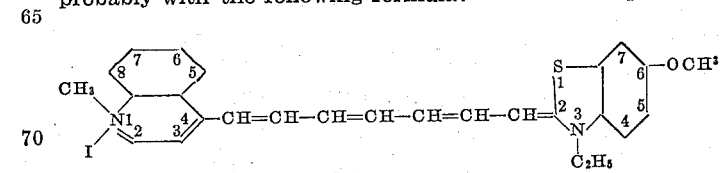

4 grams of lepidine methiodide and 5 grams of ε-N-methyl-phenylimido-α-N-methylphenyla-mido-α.γ-pentadienehydrobromide are boiled with 2 gram of triethanolamine for 2 hours in 20 cc. of alcohol. On cooling the dark blue mixture, the intermediate dyestuff corresponding probably with the following formula:

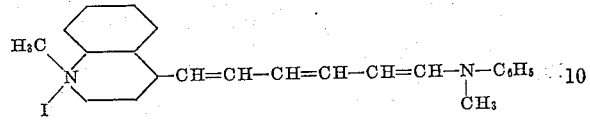

is precipitated in form of green crystals. The alcoholic solution thereof has an absorption maximum at about 655μμ.

1 gram of this intermediate product and 1 gram of 2-methyl-6-methoxybenzthiazole ethiodide are heated, until dissolution occurs, and then mixed with 2 cc. of an alcoholic solution of trimethylamine of about 50 per cent strength, whereby the color changes to green. After cooling [1-methyl-quinoline-(4)]-[3-ethyl-6-methoxy-benzthiazole-(2)]-heptamethinecyanine iodide is precipitated as a bluish black crystalline powder.

Incorporated in a silver bromide emulsion containing about 2 per cent of silver iodide, the dye imparts to it a range of sensitivity from about 650μμ to 950μμ with a maximum at about 830μμ.

*Example 18.*—In order to obtain [1-ethyl-quinoline-(2)]-[3.5-dimethyl-thiazole-(2)]-heptamethinecyanine iodide corresponding probably with the following formula:

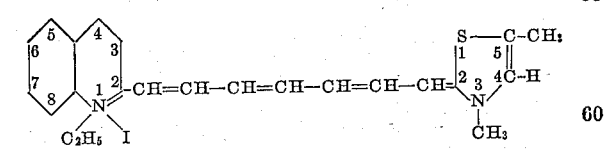

5 grams of quinaldine ethiodide together with 4 grams of ε-N-methylphenylimido-α-N-methylphenylamido-α.γ-pentadiene hydrobromide are boiled for 2 hours in 20 cc. of alcohol while adding 2 cc. of triethanolamine. On cooling, N-ethylquinohexamethine-anilide iodide is precipitated in green needles; the alcoholic solution has an absorption maximum at about 610μμ.

In order to produce the unsymmetrical cyanine dyestuff having the above formula, 1 gram of the intermediate dyestuff is boiled with 2.4-dimethylthiazole methiodide in 10 cc. of alcohol, mixed with about 1 cc. of diethylamine and kept boiling, until the mixture assumes a dark blue color. On cooling, the dye is precipitated in green needles.

Incorporated in a silver bromide emulsion containing about 2 per cent of silver iodide, the dye imparts to it a range of sensitivity from about 700μμ to 900μμ with a maximum at about 840μμ.

*Example 19.*—The dye [3-ethyl-5-ethoxy-benzselenazole-(2)]-[3-ethyl-5-chloro-6-methoxy-benzthiazole-(2)]-heptamethinecyanine iodide corresponding to the formula:

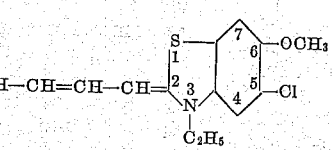

may be produced as follows:

4 grams of 2-methyl-5-ethoxy-benzselenazole ethiodide are dissolved with 5 grams of ε-N-methyl-phenyl-imido-α-N-methyl-phenylamido-α.γ-pentadiene hydro-bromide in 30 cc. of alcohol. After the addition of 0.7 cc. of benzylamine the mixture is heated to 100° C. for about 3 hours. On cooling the intermediate product separates in form of green crystals. Recrystallization from alcohol yields green leaves.

1.1 grams of the intermediate product, 0.8 gram of 2-methyl-5-chloro-6-methoxy-benzthiazole ethiodide and 10 cc. of alcohol are heated, while adding 2 cc. of an alcoholic solution of trimethylamine of 50 per cent strength, until the dye separates in form of crystals. Recrystallization from methanol yields brownish green crystals.

Incorporated in a silver bromide emulsion containing about 4 per cent of silver iodide, the dye imparts to it a range of sensitivity from about 670 to 900μμ, with a maximum at about 830μμ.

*Example 20.*—The dye [3-ethyl-benzthiazole-(2)]-[3-ethyl-5.6-methylene-dioxy-benzthiazole-(2)]-heptamethinecyanine iodide corresponding with the following formula:

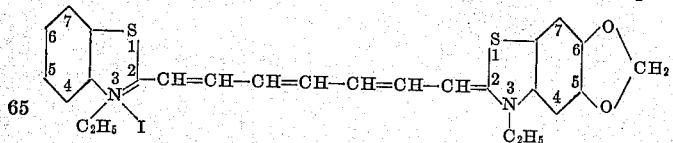

is obtained by heating 4 grams of 2-methylbenzthiazole ethiodide with 5 grams of ε-N-methyl-phenylimido-α-N-methyl-phenylamido-α.γ-pentadiene hydro-bromide in 20 cc. of alcohol to 100° C. until the mixture assumes a dark blue color (about 3 hours), while adding 2 cc. of an alcoholic solution of trimethylamine of 50 per cent strength. On addition of about 5 cc. of a 5 per cent solution of potassium iodide the intermediate product corresponding probably with the formula:

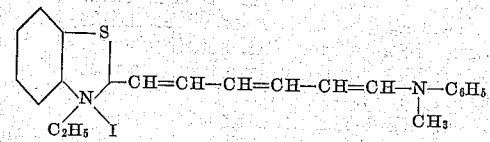

separates in form of blue-black flakes. Recrystallization from alcohol yields steel blue little rods. The alcoholic solution of the compound has an absorption maximum at about 605μμ.

.1 gram of the intermediate product is boiled with 0.8 gram of 2-methyl-5.6-methylene-dioxy-benzthiazole ethiodide in 10 cc. of alcohol while adding about 1 cc. of diethylamine, and boiling is continued for about 10 minutes. The dye separates in form of green crystals.

Incorporated in a silver bromide emulsion containing about 4 per cent of silver iodide, the dye imparts to it a range of sensitivity from about 600μμ to 900μμ with a maximum at about 825μμ.

*Example 21.*—The dye [3-ethyl-5-ethoxy-6-methyl-benzthiazole-(2)]-[3-ethyl-{acenaphtheno-5'.4':4.5-thiazole}-(2)]-heptamethinecyanine iodide corresponding with the formula:

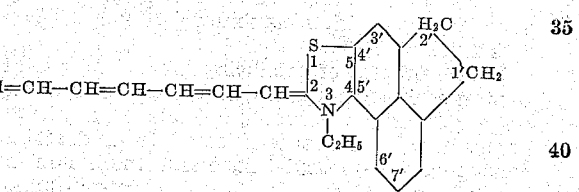

may be prepared as follows:

2 grams of 2.6-diethyl-5-ethoxy-benzthiazole ethiodide are heated with 2.5 grams of ε-N-methyl-phenylimido-α.γ-pentadiene hydro-bromide in 20 cc. of alcohol until dissolution occurs, and then there are added 2.5 cc. of an alcoholic solution of sodium ethylate of 5 per cent strength. The yellow red solution changes its color immediately to blue-red and the intermediate product corresponding probably with the following formula:

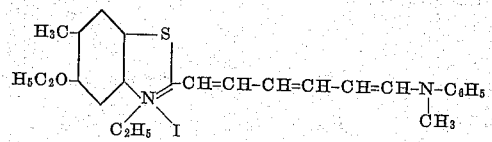

separates in form of green crystals. Heating is continued for a short period and the product is filtered off. The alcoholic solution of the compound has an absorption maximum at about 610μμ.

1 gram of the intermediate product and 1 gram of 2-methyl-acenaphthenethiazole ethiodide when heated in 15 cc. of alcohol with the addition of 1 cc. of diethylamine yield the above dye which separates in form of crystals on the wall of the reaction vessel. Recrystallization from alcohol yields green crystals.

Incorporated in a silver bromide emulsion containing about 4 per cent of silver iodide, the dye imparts to it a range of sensitivity from about 690 to 930μμ with a maximum at about 850μμ.

*Example 22.*—The dye [3-ethyl-benzthiazole-(2)]-[3-ethyl-{anthraceno - 1'.2':4.5 - thiazole}-(2)]-heptamethinecyanine iodide corresponding with the formula:

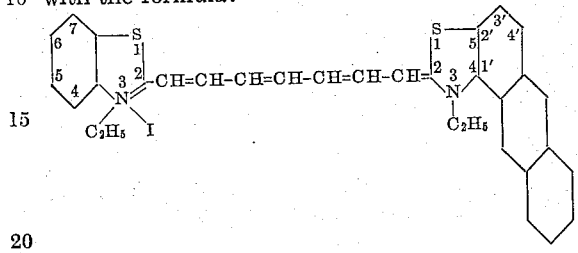

may be obtained by making the intermediate product as disclosed in Example 20 and using 1 cc. of monomethylamine as condensing agent. 1 gram of the intermediate product, 1 gram of 2-methyl-[anthraceno-1'.2':4.5-thiazole-p-toluenesulfo ethylate (2-methyl-anthrathiazole p-toluenesulfo ethylate), and 1 cc. of diethylamine are boiled in 10 cc. of alcohol for about 10 minutes. On cooling the dye separates in form of greenish brown crystals. From alcohol the dye crystallizes in form of a copper colored crystal powder.

Incorporated in a silver bromide emulsion containing about 2 per cent of silver iodide, the dye imparts to it a range of sensitivity from about 700μμ to 900μμ with a maximum at about 835μμ.

What I claim is:

1. The process of producing an unsymmetrical heptamethinecyanine which comprises reacting on a quaternary ammonium salt of a nitrogenous heterocyclic base selected from the class consisting of α-methyl-thiazoles, α-methyl-selenazoles, α-methyl-quinolines and γ-methyl-quinolines with an ε-phenylimido-α-phenylamido-α.γ-pentadiene hydrohalide in the presence of an amount of alkaline condensing agent not greater than the quantity equivalent to that of the base, and condensing the intermediate product thus obtained with another quaternary ammonium salt of a nitrogenous heterocyclic base selected from the class consisting of α-methyl-thiazoles, α-methyl-selenazoles, α-methyl-quinolines and γ-methyl-quinolines in the presence of an alkaline condensing agent.

2. The process of producing an unsymmetrical heptamethinecyanine which comprises reacting on a quaternary ammonium salt of a nitrogenous heterocyclic base selected from the class consisting of α-methyl-thiazoles, α-methyl-selenazoles, α-methyl-quinolines and γ-methyl-quinolines with an amount of ε-phenylimido-α-phenylamido-α.γ-pentadiene hydrohalide substantially surpassing the quantity equivalent to that of the base in the presence of an amount of alkaline condensing agent not greater than the quantity equivalent to that of the base, and condensing the intermediate product thus obtained with another quaternary ammonium salt of a nitrogenous heterocyclic base selected from the class consisting of α-methyl-thiazoles, α-methyl-selenazoles, α-methyl-quinolines, and γ-methyl-quinolines in the presence of an alkaline condensing agent.

3. The process of producing [3-ethyl-benzselenazole-(2)]-[3-ethyl-4-methyl - thiazole-(2)]-heptamethinecyanine iodide which comprises reacting on 2-methyl-benzselenazole ethiodide with ε-phenyl-imido - α - phenylamido-α.γ-pentadiene hydrobromide in the presence of an amount of piperidine not greater than the quantity equivalent to that of said base, and condensing the intermediate product thus obtained with 2.4-dimethylthiazole ethiodide in the presence of diethylamine.

4. The process of producing [3-ethyl-benzselenazole - (2)] - [1 - ethyl-quinoline-(4)]-heptamethinecyanine iodide which comprises reacting on 2-methyl-benzselenazole ethiodide with ε-N-methylphenylimido-α-N-methylphenylamido-α.γ-pentadiene hydrobromide in the presence of an amount of triethanolamine not greater than the quantity equivalent to that of said base, and condensing the intermediate product thus obtained with lepidine iodo ethylate in the presence of triethylamine.

5. The process of producing [3-ethyl-benzthiazole-(2)]-[3-ethyl-{naphtho-2'.1':4.5-thiazole}-(2)]-δ-methyl-heptamethinecyanine iodide which comprises reacting on 2-methylbenzthiazole ethiodide with ε-phenyl-imido α-phenylamido-γ-methyl-α.γ-pentadiene hydrobromide in the presence of an amount of piperidine not greater than the quantity equivalent to said base and condensing the intermediate product thus obtained with 2-methyl-{naphtha-2'.1':4.5-thiazole}-eth-iodide in the presence of diethylamine.

WALTER ZEH.